United States Patent [19]

Konsbruck et al.

[11] 3,896,914
[45] July 29, 1975

[54] VEHICLE DRIVE WITH CLUTCH ENGAGEMENT CONTROL

[75] Inventors: Robert H. Konsbruck, Palatine; Robert T. Scott, Joliet, both of Ill.

[73] Assignee: General Motors Corporation, Detroit, Mich.

[22] Filed: May 31, 1974

[21] Appl. No.: 474,968

[52] U.S. Cl............... 192/.098; 91/358 R; 91/361; 92/62; 74/874; 192/.02; 192/.084; 318/10
[51] Int. Cl........................................... B60k 21/00
[58] Field of Search............... 192/.02, .098, .084; 74/874; 318/10

[56] References Cited
UNITED STATES PATENTS

| | | | |
|---|---|---|---|
| 2,283,133 | 5/1942 | Allen et al. | 192/.098 |
| 3,136,174 | 6/1964 | Soulier | 74/874 |
| 3,398,820 | 8/1968 | Bettis | 192/.084 |
| 3,406,796 | 10/1968 | Vlieg et al. | 192/.084 |

*Primary Examiner*—Benjamin W. Wyche
*Attorney, Agent, or Firm*—Robert J. Outland

[57] ABSTRACT

A vehicle drive having in a preferred embodiment an electric traction motor powering a drive axle through a toothed clutch coupling shiftable between forward and reverse positions through a neutral position. Pneumatic shift means for the clutch are controlled in part by a detent and sensing mechanism which indicates the position of the clutch and controls the operation of the air cylinders and the application of power to the traction motor so that the coupling may be rotated for proper engagement but will not be permitted to reach an excessive speed before it is fully engaged. Certain additional features of the arrangement are also disclosed.

3 Claims, 2 Drawing Figures

VEHICLE DRIVE WITH CLUTCH ENGAGEMENT CONTROL

FIELD OF THE INVENTION

This invention relates to vehicle drives of the type including forward and reverse gearing and a toothed coupling shiftable to connect the gearing in either the forward or reverse operating mode. In its more particular aspects, the invention relates to electric motor driven vehicles having mechanically shifted forward and reverse gearing and especially of the type powered directly by a high voltage electric power source as used on electric railways and the like.

BACKGROUND OF THE INVENTION

It is known in the art relating to vehicle drives to provide a unidirectional rotatable drive means, which may, for example, be an electric traction motor operated in a single direction of rotation, and to connect the drive motor to the traction wheels of a vehicle, such as a rail car, through suitable forward and reverse gearing. It is further known to provide mechanically actuated clutch means for shifting the drive to either its forward or reverse modes of operation.

When a clutch is provided in the final drive of a heavy duty vehicle such as a rail car, it is known to use a non-slipping type, such as a toothed face coupling, which is capable of transmitting high torque loads. In shifting such couplings, however, care must be taken to see that the coupling is fully engaged before the drive motor is accelerated beyond a limited rotational speed required for full engagement. Otherwise, breakage of the coupling teeth or overspeeding of the drive motor might result.

SUMMARY OF THE INVENTION

The present invention provides a vehicle drive utilizing a toothed clutch coupling for selection of forward and reverse operation. The drive, also, incorporates clutch actuating, sensing, and control means which operate in response to selection of forward or reverse operating modes and opening of the throttle, to automatically control the shifting of the coupling and the application of power to the electric traction motor or other drive means. These functions are coordinated so as to positively engage the clutch before the drive motor speed is permitted to exceed a predetermined limit, but to provide for some limited rotation of the coupling under power to assure full engagement.

The clutch actuating means may include a three-position air cylinder connected with a clutch shift mechanism. The air cylinder is operated by air supplied through solenoid actuated valves which form part of the control system. Detent means act upon the air cylinder and shifting mechanism and are integrated with the control means so that the mechanism is maintained in one of its engaged positions or its neutral position after shifting has been accomplished, without continued application of air to the air cylinder. These and other features and advantages of the invention will be more fully understood from the following description of preferred embodiment taken together with the accompanying drawings.

DESCRIPTION OF THE ILLUSTRATED EMBODIMENT

Figure 1:
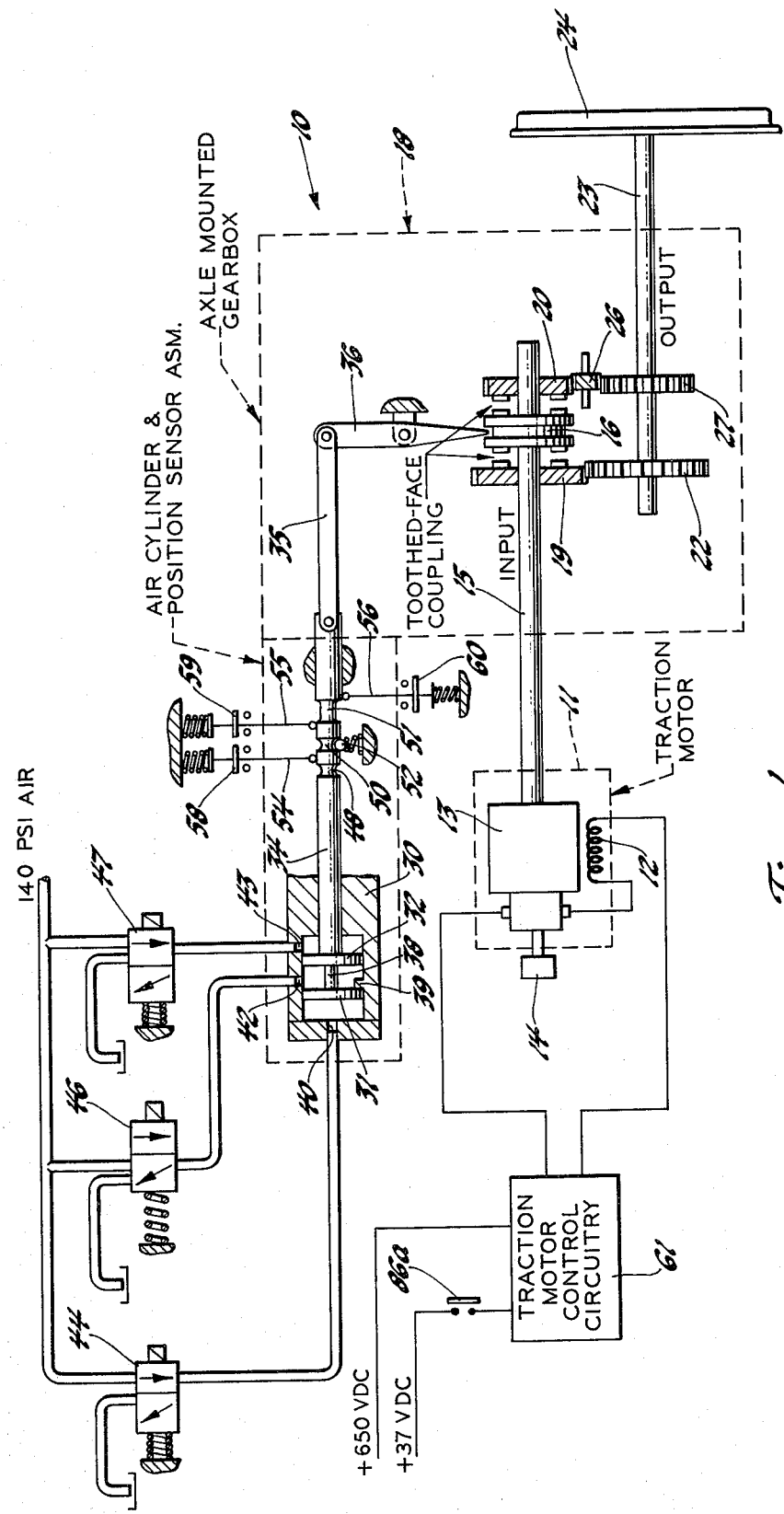
FIG. 1 is a diagrammatic view illustrating a vehicle drive arrangement formed according to the invention.

Referring now to the drawings in detail, numeral 10 generally indicates drive means for a railway type vehicle, such as a rail car. The drive means may connect with and form part of a bi-modal power and transmission system of the type disclosed in U.S. Pat. No. 3,699,351 Addie granted Oct. 17, 1972.

Drive means 10 includes an electric traction motor 11, having field windings 12 and a rotatable armature 13. The armature carries a motion switch 14 that includes a normally closed contact 14a (FIG. 2) which is opened upon rotation of the armature above a predetermined low speed.

Armature 13 is directly connected with the input shaft 15 of a toothed face clutch coupling member 16, carried within an axle mounted gear box, generally indicated by numeral 18. The gear box also includes forward and reverse input gears 19 and 20, respectively, each of which includes a toothed face engagable with one of the toothed faces of the coupling member 16 upon movement of the coupling member into engagement therewith.

Forward input gear 19 engages an output gear 22 that is drivably connected with an output axle shaft 23 that drives the wheels 24 of the vehicle. Reverse input gear 20 is connected through an idler gear 26 to a reverse output gear 27 that is also drivably connected with the output axle shaft 23.

The toothed face coupling is movable from the neutral position shown in FIG. 1, leftwardly to an intermediate forward abutment position in which the ends of the forward clutch teeth abut, but the clutch is not yet engaged. Upon proper alignment of the teeth, the coupling member may be moved further leftwardly to its fully engaged position where the teeth intermesh, locking the coupling member 16 with the input gear 19 for rotation of the drive wheel in the forward direction. In like manner, the coupling member may be moved from its neutral position rightwardly to reverse abutment and reverse engaged positions, the latter of which provides for the transmission of power to the drive wheel in the reverse direction.

Shifting of the drive mechanism coupling between its forward, neutral and reverse positions is accomplished by actuating mechanism including an air cylinder 30 containing a pair of axially spaced pistons 31, 32. Piston 32 is fixed to a piston rod 34 which connects through a link 35 with a pivotable finger 36. Finger 36 engages a groove in the coupling member 16 to shift the coupling between its various positions upon appropriate movement of the piston 32. Piston 31 includes an extending portion 38 which engages, but is not connected to, piston 32. The travel of piston 31 is limited by a stop 39 so that movement of piston 31 rightwardly to the stop moves the actuating mechanism to the coupling's neutral position.

Air cylinder 30 is provided with spaced ports 40, 42, and 43 which are respectively connected with solenoid valves 44, 46, and 47. These valves are connected with a source of high pressure air and with atmosphere. Port 40 connects with the portion of cylinder 30 to the left of piston 31, port 42 with the cylinder portion between the two pistons, and port 43 with the cylinder portion to the right of piston 32. Operation of the solenoid valves, as will be subsequently described controls the admission and discharge of air to and from the various cylinder portions.

The piston rod 34 is provided with two narrow grooves or notches 48 and 50, as well as a wider groove 51. A spring detent device 52 engages groove 50 when the coupling is in its neutral position. A combined spring detent and sensing device 54 is also provided which engages groove 48 when the coupling is in its forward engaged position and engages groove 50 when the coupling is in its reverse engaged position.

In addition, detent like sensing devices 55 and 56 are provided. Sensing device 55 engages groove 51 whenever the coupling is in its reverse abutment or reverse engaged positions, and similarly, sensing device 56 engages groove 51 whenever the coupling is in its forward engaged positions. Detent and sensing device 54 and sensing devices 55, 56 carry electrical engagement, reverse and forward limit switches 58, 59, and 60 respectively, which close when their respective devices engage any of the piston rod grooves for purposes to be subsequently described.

Power to the traction motor 11 is supplied from a 650 volt DC source controlled by traction motor controls represented by the box 61 and operated by low voltage power from a 37 volt DC power source. Since these motor controls are not part of the present invention, they will not be described in detail.

Figure 2:
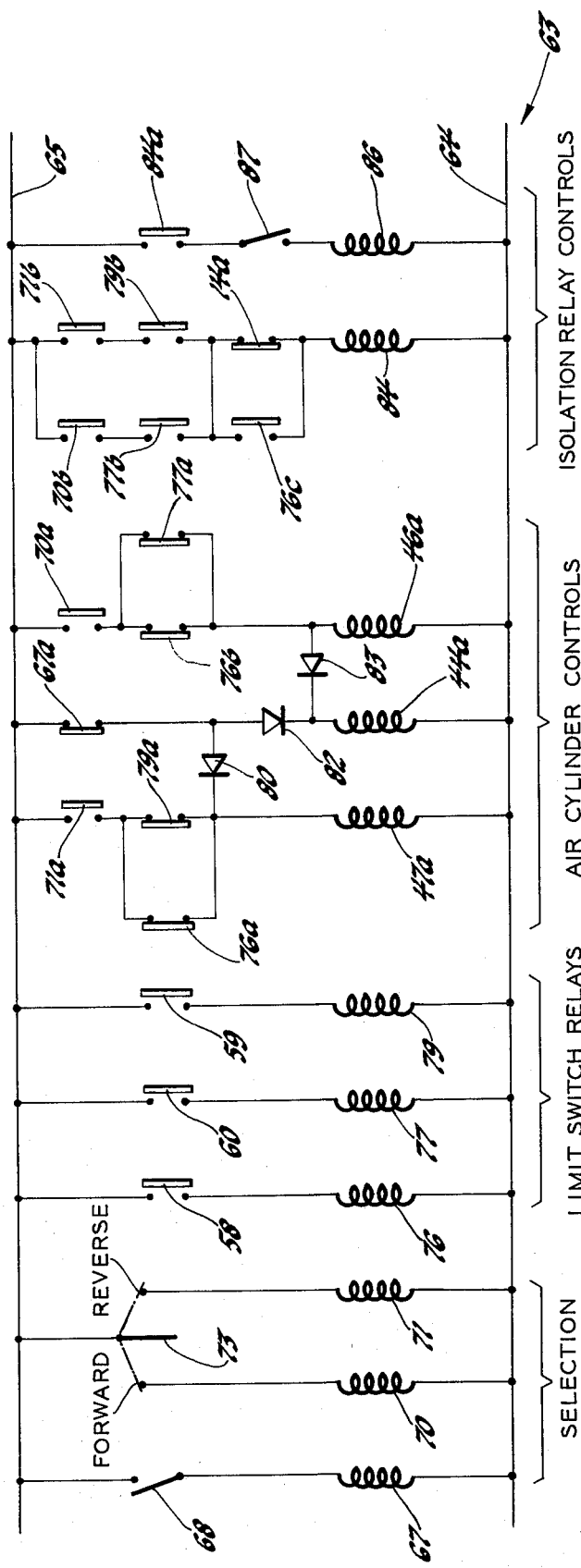
FIG. 2 is an electric circuit diagram showing certain control details for the system of FIG. 1.

FIG. 2 illustrates certain portions of the control system for the vehicle which pertain particularly to the control and operation of the previously described clutch coupling engagement and drive mechanism. The illustrated controls, generally indicated by numeral 63, are connected between a negative line 64 and a positive line 65 having a potential difference of 37 volts DC. The controls are divided into four groups comprising selection controls, limit switch relays, air cylinder controls and isolation relay controls. For descriptive purposes, certain portions of the various control components are identified by reference letters following the reference numerals of their respective components.

The selection controls include a neutral relay 67, controlled by a manually operated neutral switch 68, and forward and reverse relays 70, 71, respectively, controlled by a reverser switch 73 that may also be manually operated.

The limit switch relays comprise an engagement limit relay 76 controlled by the engagement limit switch 58, a forward limit relay 77 controlled by the forward limit switch 60 and a reverse limit relay 79 controlled by the reverse limit switch 59.

The air cylinder controls include solenoids 44a, 46a, and 47a of the corresponding solenoid valves. These solenoids are energized by various combinations of elements including normally open contacts 67a, 70a, and 71a, normally closed contacts 76a, 76b, 77a, and 79a, and current rectifiers 80, 82, and 83.

The isolation relay controls comprise a truck gear box engagement relay 84 which is controlled by the normally closed motion switch contact 14a as well as by the normally open contacts 70b, 71b, 76c, 77b, and 79b. In addition these controls include an isolation relay 86 which is controlled by a normally open contact 84a of the truck gear box engagement relay and by a throttle switch 87 which is actuated by manual opening of the engine throttle (not shown).

The isolation relay includes a normally open contact 86a in the 37 volt supply line to the traction motor controls 61 which controls the supply of power to the traction motor as will be subsequently described.

The operation of the above described portions of the drive system is as follows:

As shown in the drawings, the system is in the neutral position and the vehicle is assumed to be stationary. In order to move the vehicle in a forward direction, the operator first opens the neutral switch 68 which de-energizes the neutral relay 67, cutting off power to solenoids 44a and 47a and removing air pressure from the various chambers of the air cylinder. However, the shift mechanism remains held in the neutral position by the detent 52.

Next, the operator moves the reverser 73 to the forward position, energizing the forward relay 70 and closing switch contacts 70a and b. This completes a circuit through contact 70a as well as contacts 76b of the engagement limit relay and 77a of the forward limit relay to solenoid 46a and through rectifier 83 to solenoid 44a. This opens solenoid valves 44 and 46, admitting high pressure air to the air cylinder chambers fed by ports 40 and 42. The air pressure urges both pistons 31 and 32 toward their extreme right positions, extending the shaft 34 and moving the toothed face coupling 16 to its forward abutment position where, unless the teeth are properly aligned, it will be stopped without engagement by abutment of the ends of the coupling teeth.

The movement of the actuating mechanism to the forward abutment position causes the sensing device 56 to drop into groove 51, thereby closing the forward limit switch 60 and energizing the forward limit relay 77. This opens contact 77a, but since the circuit is still complete through contact 76b, no change occurs in the operation of the air cylinder. However, the pick-up of relay 77 also closes contact 77b, which completes the circuit through contacts 70b, 77b, and 14a to energize the truck gear box engagement relay 84. This, in turn, closes contact 84a.

No power is transmitted, however, until the operator opens the throttle, closing the throttle switch 87 and energizing the isolation relay 86. This closes contact 86a, feeding control voltage to the traction motor controls 61 and permitting the controlled application of power to the traction motor field, and armature.

As power is applied, the traction motor begins to rotate, moving the clutch coupling teeth into alignment and permitting the air pressure applied to the clutch actuator to force the coupling into the full forward engaged position. Upon reaching this position, detent and sensing device 54 drops into groove 48 of the piston shaft 34, closing the engagement limit switch 58 and energizing the engagement limit relay 76. This action opens contact 76b, cutting off the circuit to solenoids 44a and 46a. Valves 44 and 46 then close and exhaust the pressurized air from the air cylinder. The coupling is then held in the engaged position by the detent and sensing device 54.

The pick-up of engagement limit relay 76 also closes contact 76c, providing a parallel circuit to relay 84 around contact 14a. This holds in the isolation relay circuit when the motion switch 14 is actuated by subsequent acceleration of the traction motor as the vehicle accelerates under power.

If for some reason the toothed clutch coupling had failed to engage upon initial acceleration of the traction motor, motion switch 14 would have opened its contact 14a as the traction motor reached a predetermined speed. This action would have cut off current flow to the truck gear box engagement relay 84, since contact 76c of the engagement limit relay would not have been closed by engagement of the clutch. As a result, contact 84a would open, cutting off current to the isolation relay 86, thus in turn cutting off power to the traction motor. In this way damage due to overspeeding of the traction motor or extended operation of the clutch in the abutment position would be avoided.

Shifting of the reverser 83 to the reverse position disconnects the forward operation controls and in a manner similar to that described above causes operation of the relay switches and contacts required to (1) energize solenoid 47, supplying air to the actuating cylinder through port 43 and urging the actuating pistons leftwardly toward the reverse engaged position, (2) apply power to the traction motor, causing the coupling to rotate and permit full engagement of the teeth in reverse engaged position, (3) cut off the air supply to the air cylinder and exhaust residual air therefrom, leaving engagement of the detent and sensing device 54 with groove 50 to maintain the actuating mechanism in the reverse engaged position, and (4) operate the motion switch upon acceleration of the traction motor which, if the clutch were not fully engaged, would cut off power to the traction motor.

To return to the neutral position, the reverser handle must be placed in neutral, which deactivates the power circuits. Subsequent actuation of the neutral switch 68 energizes the neutral relay 67, closing contact 67a and supplying current through rectifiers 80 and 82 to solenoids 44a and 47a. This opens valves 44 and 47, which supplies air to the air cylinder through ports 40 and 43, urging piston 31 rightwardly and piston 32 leftwardly. This, in view of the differential areas of the pistons and the positioning of stop 39 in the cylinder, causes the actuator mechanism to be centered, placing the clutch in the neutral position. Subsequently, the neutral switch 68 may be opened, de-energizing the solenoid valves and exhausting the air from the cylinder, since the mechanism will be held in the neutral position by the detent 52. Preferably, the solenoid valves are made capable of manual actuation so that the clutch coupling may be shifted to neutral, if desired, in case of an electrical control system failure.

From the foregoing description, it may be seen that the present invention provides drive means which, upon selection of an operational direction and opening of the throttle by the operator, cause the clutch to be shifted and engaged upon initial acceleration of the traction motor, while providing for cut-off of power to the traction motor should clutch engagement not be complete upon the traction motor's reaching a predetermined operational speed. In addition, means are provided for movement of the clutch to a neutral position for towing of the unit or operation of the vehicle with one of its drive motors isolated.

While the invention has been described by reference to a specific embodiment, it is recognized that numerous changes could be made within the scope of the inventive concepts disclosed. Accordingly, it is intended that the invention be limited only by the language of the following claims.

What is claimed is:

1. In a vehicle drive,
rotatable drive means,
a rotatable output member
toothed clutch means between said drive means and said output member and movable into forward, neutral and reverse positions,
actuating means selectively operable to move said clutch to said positions,
control means operable to selectively supply power to or cut off power from said drive means, said control means including
forward limit means operable in response to movement of said actuating means from neutral toward the forward engaged position to permit the supplying of power to said drive means,
reverse limit means operable in response to movement of said actuating means from neutral toward the reverse engaged position to permit the supplying of power to said drive means independently of said forward limit means,
motion responsive means operable below a predetermined slow drive speed to permit the supplying of power to said drive means in cooperation with said forward and reverse limit means, and operable above said predetermined slow drive speed to cut off said cooperative power supplying operation, and
engagement limit means operable in response to movement of said actuating means to either its forward or reverse clutch engaged positions to permit the supplying of power to said drive means, in cooperation with said forward or reverse limit means and independently of said motor responsive means,
whereby said control means supplied power to said drive means only when said clutch means is engaged or when said drive means is operated below said slow drive speed and said clutch means is moved toward one of its engaged positions.

2. A vehicle drive comprising
a drive motor operable in one direction of rotation,
an output member operable in both directions of rotation,
mechanical drive means operable to connect said drive motor and said output member and including a toothed coupling movable to extreme forward and reverse engaged positions, in which said drive motor and output member are operably connected, and to intermediate positions including neutral, forward abutment and reverse abutment positions in which said drive motor and output member are operably disconnected,
electrical motor control means operative to permit application of power to said drive motor when said coupling is in either of its engaged positions or when said coupling is in either of its abutment positions and operated below a predetermined speed suitable for engagement, said motor control means being further operative to cut off power to said drive motor when said coupling is in its neutral position or when said coupling is in either of its abutment positions and said motor is operated above said predetermined speed, and
means selectively operable to move said clutch to its forward, neutral and reverse positions.

3. A vehicle drive arrangement comprising
an electric drive motor rotatably operable in one direction,
a rotatable output member operable in either direction of rotation,
mechanical drive means between said drive motor and said output member, said drive means including a toothed coupling movable into extreme forward and reverse engaged positions wherein said drive means connect said drive motor with said output member for operation in forward and reverse rotation respectively, said coupling also being movable to a centered neutral position and nonengaged forward and reverse abutment positions adjacent said neutral position,
actuating means connected with said coupling and responsive to selective application of fluid pressure to move said coupling toward and into any of said engaged and neutral positions,
fluid application means to supply pressurized fluid and selectively apply it to said actuating means,
control means connected with said drive motor and said fluid application means and selectively actuable to control operation of the fluid application means and to connect said drive motor to or disconnect it from an electric power source, said control means including
position sensing means connected with said coupling and having first switch means engagable upon movement of said coupling to either of its engaged positions to actuate said control means to connect said drive motor to said power source,
second and third switch means engagable upon movement of said coupling to its nonengaged forward and reverse abutment positions, respectively, to actuate said control means to connect said drive motor to said power source, and
motion responsive means connected with said drive motor and responsive to operation above a predetermined speed to defeat actuation of said control means by said second and third switch means, causing said control means to disconnect said drive motor from said power source above said predetermined motor speed when said coupling is in either of its abutment positions.

* * * * *